Dec. 24, 1963 D. S. STRADER 3,115,071
RECIPROCATING HYDRAULIC MOTOR
Filed Oct. 6, 1961
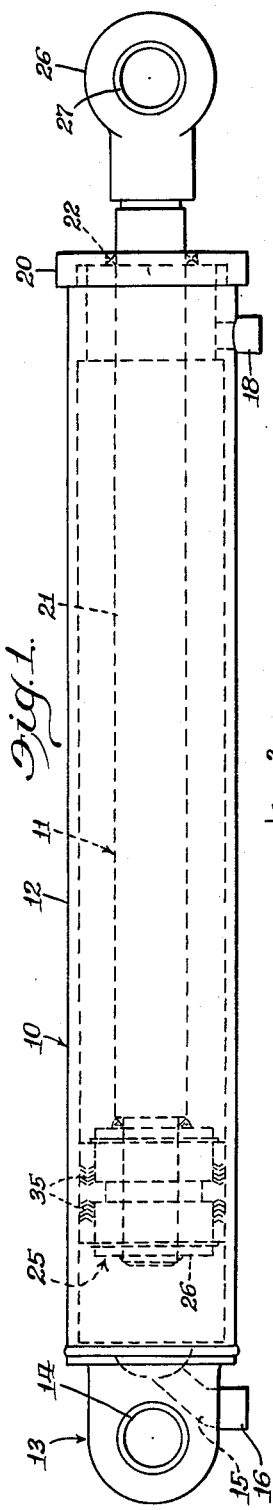
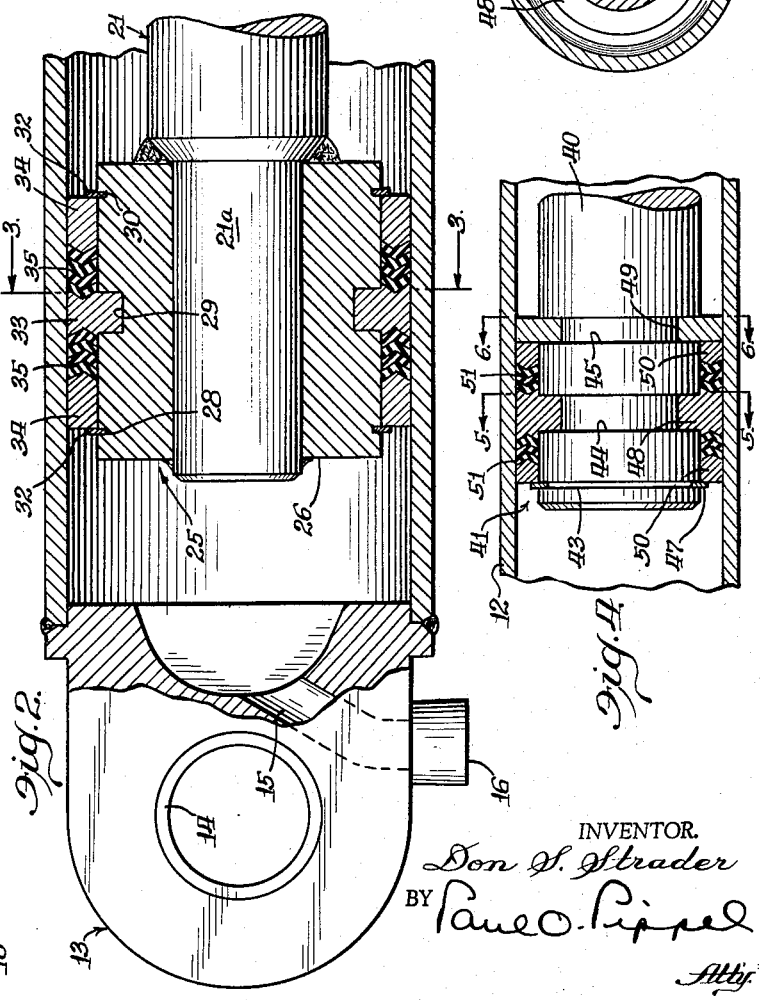
INVENTOR.
Don S. Strader
BY Paul O. Pippel
Atty.

United States Patent Office 3,115,071
Patented Dec. 24, 1963

3,115,071
RECIPROCATING HYDRAULIC MOTOR
Don S. Strader, Mount Prospect, Ill., assignor to The
Frank G. Hough Co., a corporation of Illinois
Filed Oct. 6, 1961, Ser. No. 143,379
22 Claims. (Cl. 92—257)

This invention relates generally to reciprocating hydraulic motor constructions, and more particularly to piston constructions for a reciprocating hydraulic motor.

A primary object of the invention is to provide a novel piston construction for a reciprocating hydraulic motor which is relatively simple to construct and assemble using continuous ring sealing members.

A further object of the invention is to provide a novel piston construction for a reciprocating hydraulic motor of a relatively large size such as used in large earth moving machines, which will efficiently operate under the application of relatively high loading forces.

Still another object of the invention is to provide a novel piston construction for a reciprocating hydraulic motor which obviates the need for relatively large nuts to secure the piston head to the piston rod.

Another object of the present invention is to provide a novel piston construction including at least one bearing ring for a reciprocating hydraulic motor of a relatively large size such as used in large earth moving machines, which will efficiently operate under the application of loading forces acting transversely to the reciprocatory movement of the motor without affecting the substantial engagement of the piston ring engaging the inner cylindrical wall of the motor.

Still another object is to provide a novel piston construction for a reciprocating hydraulic motor wherein the inner walls of the cylinder function to maintain the piston head assembly together as a unit.

Other objects and features of the present invention will be apparent upon a perusal of the following specification and drawing, in which:

FIGURE 1 is a side elevational view of a reciprocating hydraulic motor embodying one form of the present invention;

FIGURE 2 is an enlarged partial view of the device shown in FIGURE 1 and taken partially in cross section;

FIGURE 3 is a cross sectional view of the device shown in FIGURE 2 and taken substantially along the line 3—3 of FIGURE 2;

FIGURE 4 is a view similar to FIGURE 2, but showing a further embodiment of the invention;

FIGURE 5 is a cross sectional view of the device shown in FIGURE 4 and taken substantially along the line 5—5 of FIGURE 4; and FIGURE 6 is a cross sectional view of the device shown in FIGURE 4 and taken substantially along the line 6—6 of FIGURE 4.

The present embodiments are the preferred embodiments but it is to be understood that changes can be made in the present embodiments by one skilled in the art without departing from the spirit and scope of the present invention.

Generally, the present invention comprises a reciprocating hydraulic motor having a cylinder assembly with a piston assembly slidably carried therein for reciprocating movement relative to the cylinder. Hydraulic fluid ports are provided at each end of the cylinder for connection of hydraulic fluid conduits thereto for operation of the motor.

The novel piston construction of the present invention comprises the forming of a portion of the piston head and rod assembly with three axially spaced apart annular grooves for securely carrying the bearing rings and sealing rings which are disposed about the outer periphery of the piston head assembly.

In the embodiment which is particularly shown in FIGURE 2, an annular piston head assembly is welded to a reduced end portion of the piston rod. The outer periphery of the piston head is provided with three axially spaced annular grooves. The center annular groove carries a split bearing ring engaging on each side thereof a plurality of sealing rings. Further annular bearing rings are positioned on the piston head and against the sealing rings. The two other annular grooves which are positioned one on each side of the center groove, each carry a snap ring therein. The snap rings engage the remote ends of the bearing and sealing ring assemblies and cooperate with the center split bearing ring to secure the entire bearing and sealing ring assembly on the piston head against axial movement relative to the piston head.

In the embodiment which is particularly shown in FIGURE 4, a relatively large piston rod is provided with three axially spaced apart annular grooves at one end thereof. The center groove carries a split bearing ring which on each side thereof cooperates with a plurality of sealing rings. The groove at the head end of the piston assembly carries a snap ring which engages an annular bearing ring carried on the piston rod and engaging the sealing rings. The third annular groove, that which is positioned on the other side of the center groove at the rod end of the piston assembly is formed as a groove of substantial size, similar to the center annular groove. The third annular groove carries a split bearing ring which engages a second annular bearing ring to secure the entire bearing and sealing ring assembly together as a unit. A split bearing ring is used in the third annular groove because of the relative size of the piston rod to the internal diameter of the cylinder and the consequent exposure of the bearing and sealing rings to loading from the rod end of the motor. If the arrangement of FIGURE 4 had a snap ring in the third annular groove such as shown in FIGURE 2, the bearing and sealing rings would be required to absorb an undesirable amount of loading from the rod end of the hydraulic motor.

When the split rings are assembled in their annular grooves with the other portions of the piston construction, the piston assembly may be inserted in the cylinder assembly for reciprocating movement relative thereto. It may be noted that no nuts or bolts are used in the assembly of the piston head assembly.

In detail, the reciprocating hydraulic motor comprises a cylinder assembly 10 and a piston assembly 11 slidably carried therein for relative reciprocating movement therebetween.

The cylinder assembly 10 comprises a cylindrical tube 12 with an internal surface which is relatively smooth. The head end of the cylinder 12 is provided with an end member 13 which is secured over the end of the cylinder 12 by any suitable means such as welding. The end member 13 is provided with a hole therethrough, and a bushing 14 carried in that hole for connection of the head end of the motor in some tool arrangement. The end member 13 is further provided with a passageway 15 extending from a port 16 on the outer surface thereof into a recess which opens into the cylinder 12.

The rod end of the cylinder 12 is provided with a port 18 therethrough for the connection of a hydraulic fluid conduit thereto to deliver hydraulic fluid to the rod end of the cylinder 12. The rod end of the cylinder 12 is also provided with an end member 20 which may be secured thereto by any suitable means. The end member 20 is provided with a hole axially therethrough for the piston rod 21 of the piston assembly 11. Any suitable sealing means, as at 22, is provided between the rod end of the cylinder 12 and the piston rod 21 to permit reciprocation of the piston assembly 11 relative to the cylinder assembly 10 without the leakage of any appreciable amount of hydraulic fluid between the end member 20 and the piston rod 21.

The piston assembly 11 comprises, in addition to the piston rod 21, a piston head assembly 25 carried on the inner end of the piston rod 21. The outer end of the piston rod 21 is provided with a member 26 having a hole therethrough which carries a bushing 27 for pivotally connecting the motor in a tool arrangement.

The inner end of the piston rod 21 of the embodiment shown in FIGURES 2 and 3, is formed with a reduced diameter portion 21a.

The piston head assembly 25 comprises an annular piston head 26 with the axial hole therethrough of a diameter substantially equal to the diameter of the reduced end portion 21a of the piston rod 21. The piston head 26 is secured to the piston rod 21 by any suitable means such as welding.

The outer periphery of the piston head 26 is provided with three axially spaced apart annular grooves 28, 29 and 30. The annular groove 28 is disposed substantially adjacent the inner or head end of the reduced portion 21a of the piston rod 21. The annular groove 29 is positioned substantially midway between annular grooves 28 and 30. Annular groove 30 is positioned adjacent the rod end of the piston head 26.

The piston head assembly 25 of FIGURES 2 and 3 further comprises two snap rings 32, a spit bearing ring 33, a pair of bearing rings 34, and a plurality of sealing rings 35. The snap rings 32 are adapted to be sprung into the annular grooves 28 and 30 with portions thereof extending radially outwardly of those grooves.

The split bearing ring 33 is split along a diameter thereof so that the two semi-circular halves may be placed together to define a complete ring. The split bearing ring 33 and the bearing rings 34 are formed of a relatively soft bearing metal such as bronze. The split bearing ring 33 has an inner diameter which is substantially equal to the inner diameter of the annular groove 29. The split bearing ring 33 has an outer diameter which is substantially equal to the inner diameter of the cylinder 12. The bearing rings 34 also have outer diameters which are substantially equal to the inner diameter of the cylinder 12. The bearing rings 34 each have an inner diameter which is substantially equal to the outer diameter of the piston head 26.

The sealing rings 35 are substantially V-shaped in cross section, and are formed of a fabric material impregnated with a resilient material such as rubber or neoprene.

Each side of the portion of the split bearing ring 33 which extends radially outwardly of the annular groove 29 is formed with a somewhat V-shaped depression for cooperation with the projecting sides of the sealing rings 35. One side of each of the bearing rings 34 is formed with a somewhat V-shaped projection for cooperation with the depression side of the sealing rings 35.

The piston head assembly 25 of FIGURES 2 and 3 is initially assembled on the piston rod 21 before the piston rod 21 is inserted in the cylinder 12. Firstly, the split bearing ring 33 may be inserted in the annular groove 29 of the piston head 26. Sealing rings 35 may then be mounted about the outer periphery of the piston head 26 and against each side of the split bearing ring 33. The bearing rings 34 may then be mounted on the piston head 26 against the sealing rings 35. The snap rings 32 may then be inserted in the annular grooves 28 and 30 to lock the bearing rings 34 against axial movement relative to the piston head 26. The piston assembly 11 may then be inserted in the cylinder assembly 10 for relative reciprocating movement therebetween. When the piston assembly 11 is in the cylinder 12, the inner walls of the cylinder 12 will maintain the split bearing ring 33 in the annular groove 29.

In the embodiment of FIGURES 4 through 6, a piston rod 40 is provided with a piston head assembly 41 carried in the cylinder 12 for relative reciprocating movement therebetween. The piston rod 40 has a diameter which is substantially equal to the outer diameter of the piston head 26 of FIGURE 2. The piston rod 40 is provided with three axially spaced apart annular grooves 43, 44 and 45. Annular groove 43 is positioned adjacent the inner or head end of the piston rod 40. Annular groove 44 is positioned between annular grooves 43 and 45. Annular groove 45 is positioned on the rod end side of the piston assembly 41.

The piston head assembly 41 of FIGURES 4 through 6 further comprises a snap ring 47, a split bearing ring 48, a split bearing ring 49, two bearing rings 50 and a plurality of sealing rings 51. The snap ring 47 is adapted to be sprung into the annular groove 43 and when positioned therein will extend partially radially outwardly of the annular groove 43. The split bearing ring 48 is substantially similar to split bearing ring 33 of FIGURE 2. Split bearing ring 48 has an inner diameter substantially equal to the inner diameter of annular groove 44 and an outer diameter substantially equal to the inner diameter of cylinder 12.

The split bearing ring 49 is formed of two semi-circular portions which when placed together define a complete ring. The split bearing ring 49 has an inner diameter which is substantially equal to the inner diameter of annular groove 45, a thickness which is substantially equal to the width of annular groove 45, and an outer diameter which is substantially equal to the inner diameter of the cylinder 12. The split ring 49 may be formed of a relatively soft bearing metal such as bronze to permit the outer periphery of the split ring to engage the inner wall of the cylinder 12 in a sliding relationship during the reciprocation of the piston assembly 11 within the cylinder 12.

The bearing rings 50 are formed substantially as bearing rings 34 of FIGURE 2, and have an inner diameter substantially equal to the diameter of the piston rod 40 and an outer diameter substantially equal to the inner diameter of the cylinder 12. The sealing rings 51 are formed substantially as sealing rings 35, of a V-shaped cross section, and of a material such as a fabric impregnated with rubber or neoprene. The sealing rings 51 have an inner diameter substantially equal to the diameter of the piston rod 40 and an outer diameter substantially equal to the inner diameter of the cylinder 12.

The piston head assembly 41 is initially assembled on the piston rod 40 before the piston rod 40 is inserted in the cylinder 12. After the split bearing ring 48 is in place in the annular groove 44, and the sealing rings 51 and the bearing rings 50 are positioned about the outer periphery of the piston rod 40 on each side of the split bearing ring 48, the snap ring 47 and the split bearing ring 49 may respectively be placed in annular grooves 43 and 45 to lock the piston head assembly 41 together as a unit. The entire piston assembly may then be inserted in the cylinder 12, and the walls of the cylinder 12 will maintain the split bearing rings 48 and 49 in place on the piston rod 40. Any loading applied to the split bearing ring 49 will be applied to the piston rod 40 through the walls of the annular groove 45. Any loading at the head end of the piston head assembly 41 is applied both to the end of the piston rod 40 and through the bearing ring 50, the sealing rings 51, and the split bearing ring 48 to the piston rod 40.

Having described the invention what is considered new and desired to be protected by Letters Patent is:

1. A piston assembly for a reciprocating hydraulic motor comprising, a piston head portion, a plurality of annular grooves positioned in an axially spaced apart relationship in said piston head portion, bearing and sealing rings carried on said piston head portion between adjacent ones of said annular grooves, and means carried in said annular grooves and extending radially outwardly thereof for preventing any axial movement of said bearing and sealing rings relative to said piston head portion.

2. A piston assembly for a reciprocating hydraulic motor comprising, a piston head portion, three annular grooves formed in said piston head portion and positioned in an axially spaced apart relationship to each other, bearing and sealing rings carried on said piston head portion between the two end annular grooves, and means carried in said annular grooves and extending radially outwardly thereof for preventing any axial movement of said bearing and sealing rings relative to said piston head portion.

3. A piston assembly for a reciprocating hydraulic motor comprising, a piston head portion, three annular grooves formed in said piston head portion and positioned in an axially spaced apart relationship to each other, first bearing and sealing rings carried on said piston head portion between the center annular groove and one end annular groove, second bearing and sealing rings carried on said piston head portion between said center annular groove and the other end annular groove, a bearing ring carried in said center annular groove and extending radially outwardly thereof between said first and second bearing and sealing rings, and means carried in said end annular grooves and extending radially outwardly thereof for preventing any axial movement of said first and second bearing and sealing rings relative to said piston head portion.

4. A piston assembly as defined in claim 3, wherein said bearing ring in said center annular groove is formed in two semi-circular portions.

5. A piston assembly as defined in claim 4, wherein said bearing ring in said center annular groove is further formed on each side of the portion thereof extending radially outwardly of said center annular groove as sealing ring retaining means.

6. A piston assembly as defined in claim 3, wherein said means carried in said end annular grooves comprises snap rings.

7. A piston assembly for a reciprocating hydraulic motor comprising, an annular piston head secured to a piston rod, a plurality of annular grooves formed in an axially spaced apart relationship to each other in the outer periphery of said piston head, bearing and sealing rings carried on said piston head between adjacent ones of said annular grooves, and means carried in said annular grooves and extending radially outwardly thereof for preventing any axial movement of said bearing and sealing rings relative to said piston head.

8. A piston assembly for a reciprocating hydraulic motor comprising, an annular piston head secured to a piston rod, three annular grooves formed in the outer periphery of said piston head and positioned in an axially spaced apart relationship to each other, bearing and sealing rings carried on the outer periphery of said piston head between the two end annular grooves, and means carried in said annular grooves and extending radially outwardly thereof for preventing any axial movement of said bearing and sealing rings relative to said piston head.

9. A piston assembly for a reciprocating hydraulic motor comprising, an annular piston head secured on a piston rod, three annular grooves formed in the outer periphery of said piston head and positioned in an axially spaced apart relationship to each other, first bearing and sealing rings carried on the outer periphery of said piston head between the center annular groove and one end annular groove, second bearing and sealing rings carried on the outer periphery of said piston head between said center annular groove and the other end annular groove, a bearing ring carried in said center annular groove and extending radially outwardly thereof between said first and second bearing and sealing rings, and means carried in said end annular grooves and extending radially outwardly thereof for preventing any axial movement of said first and second bearing and sealing rings relative to said piston head.

10. A piston assembly as defined in claim 9, wherein said bearing ring in said center annular groove is formed in two semi-circular portions.

11. A piston assembly as defined in claim 10, wherein said bearing ring in said center annular groove is further formed as sealing ring retaining means on each side of the portion thereof extending radially outwardly of said center annular groove.

12. A piston assembly as defined in claim 9, wherein said means carried in said end annular grooves comprises snap rings.

13. A piston assembly for a reciprocating hydraulic motor comprising, a piston rod having a plurality of annular grooves formed in one end thereof in an axially spaced apart relationship to each other, bearing and sealing rings carried on said piston rod between adjacent ones of said annular grooves, and means carried in said annular grooves and extending radially outwardly thereof for preventing any axial movement of said bearing and sealing rings relative to said piston rod.

14. A piston assembly for a reciprocating hydraulic motor comprising, a piston rod having three annular grooves formed therein and positioned in an axially spaced apart relationship to each other at one end of said piston rod, bearing and sealing rings carried on said piston rod between the two end annular grooves, and means carried in said annular grooves and extending radially outwardly thereof for preventing any axial movement of said bearing and sealing rings relative to said piston rod.

15. A piston assembly for a reciprocating hydraulic motor comprising, a piston rod having three annular grooves formed therein and positioned in an axially spaced apart relationship to each other at one end of said rod, first bearing and sealing rings carried on said piston rod between the center annular groove and one end annular groove, second bearing and sealing rings carried on said piston rod between said center annular groove and the other end annular groove, a bearing ring carried in said center annular groove and extending radially outwardly thereof between said first and second bearing and sealing rings, and means carried in said end annular grooves and extending radially outwardly thereof for preventing any axial movement of said first and second bearing and sealing rings relative to said piston rod.

16. A piston assembly as defined in claim 15, wherein said bearing ring in said center annular groove is formed in two semi-circular portions.

17. A piston assembly as defined in claim 16, wherein said bearing ring in said center annular groove is further formed on each side of the portion extending radially outwardly of said center annular groove as sealing ring retaining means.

18. A piston assembly as defined in claim 15, wherein said means carried in said end annular grooves comprises a snap ring carried in the end annular groove at the head end of the piston assembly and a diametrically split bearing ring carried in the end annular groove at the rod end of the piston assembly.

19. A piston assembly for a reciprocating hydraulic motor comprising, a piston head portion, a pair of annular grooves formed in said piston head portion and positioned in an axially spaced apart relationship, a bearing ring carried on said piston head portion between said annular grooves and adjacent one of said annular grooves, sealing rings carried on said piston head portion between said bearing ring and the other annular groove, a split bearing ring carried in said other annular groove and extending radially outwardly thereof in cooperation with said sealing rings, and means carried in said one annular groove and extending radially outwardly thereof for preventing any axial movement of said first bearing ring relative to said piston head portion.

20. A piston assembly for a reciprocating hydraulic motor comprising, a piston head portion, a pair of annular grooves formed in said piston head portion and positioned in an axially spaced apart relationship, a bearing ring carried on said piston head portion between said annular grooves and adjacent one of said annular grooves, a sealing ring carried on said piston head portion between said bearing ring and the other annular groove, a ring means carried in said other annular groove and extending radially outwardly thereof in cooperation with said sealing ring, and means carried in said one annular groove and extending radially outwardly thereof for preventing any axial movement of said bearing ring relative to said piston head portion.

21. A piston assembly for a reciprocating hydraulic motor comprising, a piston head portion, a plurality of annular grooves formed in said piston head portion and positioned in an axially spaced apart relationship, a bearing ring at least one thereof carried on said piston head portion between adjacent ones of said annular grooves, and means carried in said annular grooves and extending radially outwardly thereof for preventing any axial movement of said bearing ring relative to said piston head portion.

22. A piston assembly for a reciprocating hydraulic motor comprising, a piston head portion, an annular groove formed in said piston head portion, means formed on said piston head portion to extend radially outwardly therefrom, said formed means spaced apart in an axial relationship from said annular groove, a bearing ring carried on said piston head portion adjacent said annular groove, a sealing ring carried on said piston head portion between said bearing ring and said formed means, said radially extending formed means cooperating with said sealing ring, and means carried in said annular groove and extending radially outwardly thereof for preventing any axial movement of said bearing ring relative to said piston head portion and said formed means thereon.

References Cited in the file of this patent
UNITED STATES PATENTS

| | | |
|---|---|---|
| 1,949,612 | Mattair et al. | Mar. 6, 1934 |
| 2,306,800 | Caldwell | Dec. 29, 1942 |
| 2,970,871 | Flick | Feb. 7, 1961 |
| 2,987,353 | Smith | June 6, 1961 |